United States Patent [19]
Akins et al.

[11] Patent Number: 5,920,364
[45] Date of Patent: Jul. 6, 1999

[54] LIQUID CRYSTAL DISPLAY DEVICE WITH MASKED IMAGES

[75] Inventors: Robert Akins, Palatine; George M. Ventouris, Lake Zurich, both of Ill.

[73] Assignee: Motorola, Inc., Schaumburg, Ill.

[21] Appl. No.: 09/130,785

[22] Filed: Aug. 7, 1998

[51] Int. Cl.[6] .................................................. G02F 1/1333
[52] U.S. Cl. ......................... 349/110; 349/146; 349/115; 349/176
[58] Field of Search .................................... 349/110, 115, 349/175, 176, 20, 146

[56] References Cited

U.S. PATENT DOCUMENTS

| | | | |
|---|---|---|---|
| 4,105,288 | 8/1978 | Geffcken et al. | 350/336 |
| 4,518,225 | 5/1985 | Fredrickson et al. | 350/338 |
| 4,810,062 | 3/1989 | Aoki et al. | 350/339 |
| 5,223,958 | 6/1993 | Berry | 359/43 |
| 5,453,863 | 9/1995 | West et al. | 359/91 |
| 5,625,477 | 4/1997 | Wu et al. | 349/35 |

*Primary Examiner*—William L. Sikes
*Assistant Examiner*—Robert J. Hollingshead
*Attorney, Agent, or Firm*—Douglas D. Fekete; Heather R. Hodge

[57] ABSTRACT

A cholesteric liquid crystal display device with improved display images is provided. The device includes a transparent front plate (16) with a front conductive film (18) spaced apart from a back conductive film (22) by a gap filled with cholesteric liquid crystal material (24) which can be switched between a transparent state and a reflective state through application of an electric field. The front conductive film (18) is coated with an opaque mask which defines openings (36) for transmitting light. In the reflective state, ambient light entering the device (10) is reflected by the cholesteric liquid crystal (24) through openings (36) in the opaque mask (12) to form a bright image. In the transparent state, ambient light entering the device (10) passes through the cholesteric liquid crystal (24), front film (18) and back film (22) and is substantially absorbed by an underlying opaque layer (14) which is preferably color-matched to the internal mask (12) to form an single color, image-free display area.

14 Claims, 1 Drawing Sheet

LIQUID CRYSTAL DISPLAY DEVICE WITH MASKED IMAGES

BACKGROUND OF THE INVENTION

This invention relates to a cholesteric liquid crystal display device, and, more particularly, to a cholesteric liquid crystal display device employing an internal mask and back opaque layer to provide higher quality images.

A typical cholesteric liquid crystal display device comprises a cholesteric liquid crystal material disposed between two transparent plates. The inner surface of each plate is coated with a transparent, conductive film which serves as an electrode. In response to an electric field applied between the electrodes, the cholesteric liquid crystal switches between a transparent state and a reflective state. Typically, the electrodes are patterned such that the portions of the cholesteric liquid crystal they activate electrically will form an image.

The liquid crystal immediately adjacent to the activated liquid crystal may also become activated, resulting in a "bleeding" of the image into the area surrounding the desired image. This results in a fuzzier, lower-quality image. In addition, once cholesteric liquid crystal material is activated, it remains activated. While this provides a benefit over other liquid crystals in that there is no need to repeatedly redraw the image, this characteristic of cholesteric liquid crystals may also negatively effect image quality. Because cholesteric liquid crystals can be activated by temperature and flexion stresses, not just electrically, areas of the display may be activated which were not intended to be activated. Once activated, the unwanted display areas cannot be readily deactivated. This results in unnecessary image elements in the display and lower quality display images.

Thus, there exists a need for a cholesteric liquid crystal display device that forms a predetermined image having improved image quality and contrast, and without image detraction due to activation of unwanted regions.

SUMMARY OF THE INVENTION

The present invention provides an improved cholesteric liquid crystal display device that includes an internal mask and a back opaque layer for the purpose of defining a display image which improves quality of the display while hiding from view any undesired activated regions which would otherwise adversely affect the quality of the display.

This invention generally includes an internal mask material disposed on the interior surface of the front panel of a liquid crystal device such that openings exist in the material through which light can be transmitted and which form the shape of a display image. When the cholesteric liquid crystal is electrically switched to the reflecting state, light entering the display device is reflected back to the viewer in a color determined by the composition of the cholesteric liquid crystal, including any chiral dopant which might be added to affect the pitch or color of the cholesteric liquid crystal material. In the preferred embodiment, the color reflected by the cholesteric liquid crystal contrasts with both the internal mask and the back opaque layer. As such, when the cholesteric liquid crystal is in the reflective mode, a display image is seen as defined by the light reflected back from the cholesteric liquid crystal through the openings in the internal mask. Furthermore, the front mask hides from view any portions of the liquid crystal material which have become unintentionally activated through "bleeding," or by flexion, temperature or other unintended stressors, which would otherwise impair the quality of the display.

When portions of the cholesteric liquid crystal are electrically switched to the transparent state, the back opaque layer is visible through those portions. In the preferred embodiment, the back opaque layer is matched in color to the internal mask. As such, when the cholesteric liquid crystal is in the transparent state, the reflection of light from the opaque layer through the opening in the internal mask will appear as the same color as the internal mask and thus no display image will be seen.

According to one embodiment of this invention, the display image can be defined by the shape of the opening in the mask material rather than by the pattern of the electrodes. As such, an image can be formed by activation of a single, larger pixel seen through the shaped mask rather than using an array of smaller pixels activated in the shape of the desired image, which also results in higher-quality images.

BRIEF DESCRIPTION OF THE DRAWINGS

There now follows a more detailed description of the invention with the aid of the following accompanying figures.

DETAILED DESCRIPTION OF A PREFERRED EMBODIMENT

Figure 1:
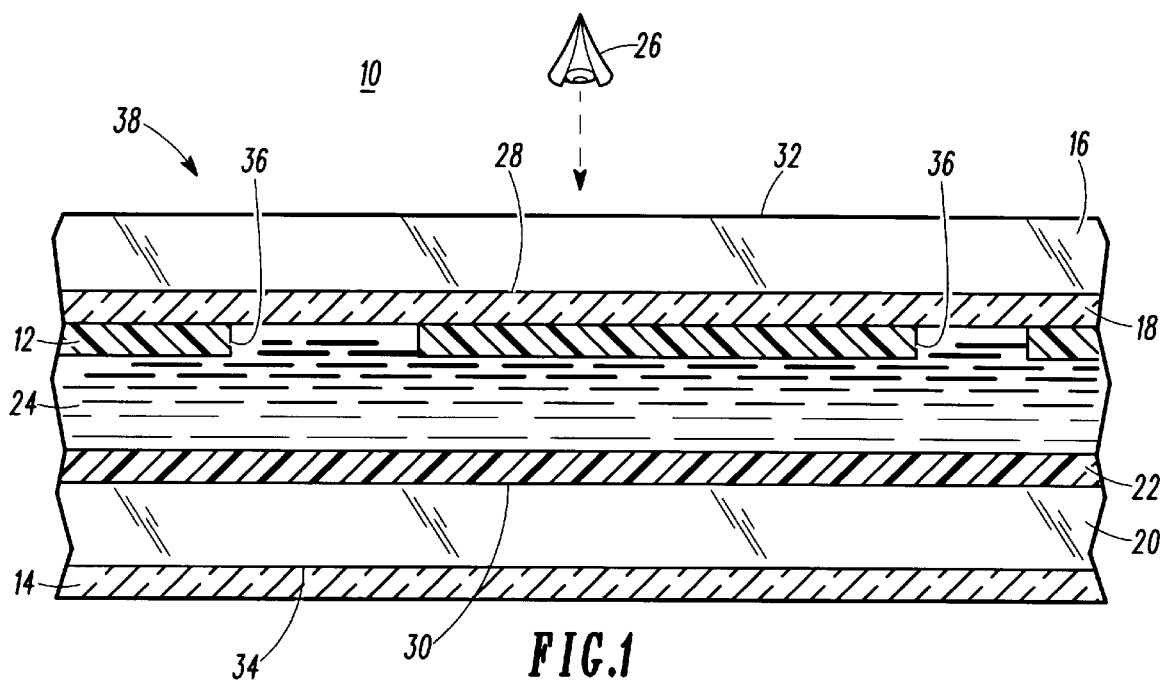
FIG. 1 is a cross-sectional view of a cholesteric display device with an internal mask and back absorbing layer, in accordance with a preferred embodiment of the present invention.
Figure 2:
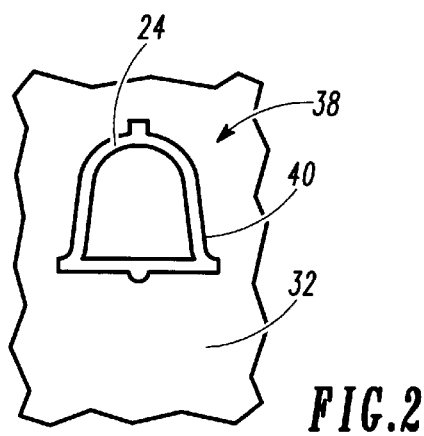
FIG. 2 is a plan view of the cholesteric liquid crystal display device in FIG. 1, with the device in the reflective state.

In accordance with a preferred embodiment of the invention, FIG. 1 shows a cholesteric liquid crystal display device 10 adapted for illumination by ambient light for producing image 40, shown generally in FIG. 2, but which can take any shape that is desired. Device 10 comprises front plate 16 and back plate 20 spaced apart by a gap that contains cholesteric liquid crystal material 24.

Front plate 16 is formed of a transparent panel, and provides a substantially planar front surface 32 and region 38 for forming a display through which the display image is viewed by observer 26. Front plate 16 is preferably glass of sufficient thickness to provide stability to device 10, though it could alternately be formed of transparent plastic or a material of suitable strength and transparency.

Front plate 16 comprises front conductive layer 18 disposed on front inner surface 28 of front plate 16. Front conductive film 18 provides a medium through which an electrical charge may be passed to activate cholesteric liquid crystal material 24. Front conductive film 18 is preferably a transparent, electrically conductive material such as indium tin oxide, and is applied at a thickness sufficient to promote conduction while still thin enough to maintain transparency. In an alternate embodiment, the conductive material is antimony tin oxide or a material similarly suited to provide conductivity at thicknesses thin enough to be transparent. Conductive film 18 is preferably applied to front plate 16 in a uniform layer that substantially covers front plate 16 within region 38, but it may alternately be applied in strips or other patterns within region 38 suitable for forming desired images viewable by observer 26.

Device 10 further includes back plate 20. Back conductive film 22 is disposed on inner surface 30 of back plate 20.

Back conductive film 22 provides a medium through which an electrical charge may be passed to activate cholesteric liquid crystal material 24. Back conductive film 22 is preferably a transparent, electrically conductive material such as indium tin oxide and is applied at a thickness sufficient to promote conduction while still thin enough to maintain transparency. In an alternate embodiment, the conductive material is antimony tin oxide or a material similarly suited to provide conductivity at thicknesses thin enough to be transparent. By way of example, in this embodiment, conductive film 22 is preferably applied to back plate 16 as a continuous layer, but it may alternately be applied in strips or patterns as suitable for forming desired images viewable by observer 26.

In a preferred embodiment, back plate 20 is transparent, and opaque layer 14 is printed on outer surface 34 of back plate 20 to absorb light transmitted through device 10. Alternately, opaque layer 14 could be applied by spin coating, spraying or like method or applied as a discrete film adhesively bonded to back plate 20. In an alternate embodiment, opaque layer 14 is located on inner surface 30 of back plate 20 or on back conductive film 22 adjacent to cholesteric liquid crystal 24. In the preferred embodiment, opaque layer 14 is applied as a separate layer to facilitate matching the color of opaque layer 14 and internal mask 12 and for ease in processing. Alternately, back plate 20 could itself be sufficiently opaque to absorb light transmitted through device 10 with no additional opaque layer 14 present.

Device 10 further includes cholesteric liquid crystal material 24 disposed in the gap between front plate 16 and back plate 20. In the preferred embodiment, cholesteric liquid crystal material 24 reflects light in the visible spectrum. Cholesteric liquid crystal material 24 can be electrically activated to move between a transparent state and a reflective state by applying a charge to front conductive film 18 and a charge of opposite polarity to back conductive film 22. An electric field will be formed in the gap between front conductive film 18 and back conductive film 22 which will alter the orientation of cholesteric liquid crystal material 24 to switch it between the transparent and reflective states. In the preferred embodiment, it is recognized that the entire portion of cholesteric liquid crystal 24 activated by the electric field will switch states. However, internal mask 12 will hide from view any cholesteric liquid crystal 24 in the reflective state which is not part of the image intended to be observed.

When device 10 is in the transparent state, as light enters device 10 through front plate 16, it passes through cholesteric liquid crystal material 24 which is in its transparent state, and is at least partially absorbed by layer 14. When device 10 is in the reflective state, as light enters device 10 through front plate 16, it is separated into two components, a right circularly polarized component and a left circularly polarized component. One component is reflected back to observer 26 by cholesteric liquid crystal 24 in the reflective state. The other component is, in the preferred embodiment, absorbed by back opaque layer 14. When viewed, desired display image 40 will be seen as the color of the light reflected through front plate 16 from the activated portions of cholesteric liquid crystal material 24. In an alternate embodiment, back opaque layer 14 is pigmented to reflect light of a desired color. As light enters the device, one component of light is reflected by cholesteric liquid crystal material 24 back to observer and the second component is reflected by back opaque layer 14 such that the two components are viewed by observer 26 as a desired color. As such, when viewed, desired display image 40 will be seen as the color of the combined light reflected through front plate 16 from the activated portions of cholesteric liquid crystal material 24 and the light reflected by opaque layer 14.

In accordance with this invention, device 10 further includes internal mask 12. Internal mask 12 is formed of an opaque dielectric material, preferably a polymeric film. Internal mask 12 defines an opening 36 or openings in mask 12 in the size and shape of display image 40, as shown by example in FIG. 2. Internal mask 12 spans display region 38 exclusive of opening 36 or openings which define display image 40 and thus prevents observer 26 from viewing any cholesteric liquid crystal material 24 which has become active through bleeding or through temperature, flexion or other stresses rather than as a result of activation by the electric field applied between front conductive film 18 and back conductive film 22.

In a preferred embodiment, internal mask 12 is formed of a pigmented, polymeric coating of the type known as positive photoresist and containing an agent to selectively control curing of the coating in desired regions. Said coating is applied in liquid form to front electrode 18 by printing. Alternatively, said coating may be applied by spin coating, spraying or like method. Selected regions of the coating are irradiated to activate an agent which inhibits curing of the selected regions. Thereafter, the coating is developed to cure the unirradiated regions and to remove the uncured material, forming opening 36 which defines the shape of display image 40. In an alternate embodiment, internal mask 12 is formed by applying negative photoresist to front electrode 18, wherein the irradiated regions are cured and the unirradiated regions are removed to form opening 36. In another embodiment, internal mask 12 is formed by disposing a clear layer on inner surface 28 of front plate 16 and infusing the clear layer with a pigment such that the areas devoid of pigment form the desired display image. In this instance, opening 36 in mask 12 is a clear film of the same thickness as the surrounding pigmented film, providing a layer of consistent thickness. Internal mask 12 is preferably applied in a thickness of $0.1\mu$ to $0.5\mu$, so that the pitch of cholesteric liquid crystal 26, and thus the color reflected by cholesteric liquid crystal 26, is not noticeably affected by any difference in gap width which may exist between the areas of device 10 coated with internal mask 12 and those areas which are not so coated.

Internal mask 12 is preferably disposed between front conductive film 18 and cholesteric liquid crystal 24, but could alternatively be disposed between front plate 16 and front conductive film 18. Internal mask 12 is preferably matched in color to back opaque layer 14 to create a uniform color appearance in the absence of a display. In an alternative embodiment, internal mask 12 is matched in color with the light reflected by cholesteric liquid crystal material 24 while in the reflective state. In another alternative, internal mask 12 is not matched in color with either cholesteric liquid crystal 24 or back opaque layer 14.

By way of example, in the preferred embodiment, internal mask 12 and back opaque layer 14 are preferably pigmented black and cholesteric liquid crystal 24 may be of any desired color. When cholesteric liquid crystal material 24 is in the reflective state, one component of light is reflected by cholesteric liquid crystal material 24 and is seen by observer 24 as a bright image of the color reflected by cholesteric liquid crystal material 24 against a black background. The second component of light is absorbed by black back opaque layer 14. When cholesteric liquid crystal 24 is in the transparent state, the black color of back opaque layer 14 will be seen and will match the black color of internal mask 12 such that a solid expanse of black will be seen by observer 26 and no image will be observed. Similarly, internal mask 12 and back opaque layer 14 could be pigmented blue, with cholesteric liquid crystal material 24 having a pitch sufficient to reflect yellow light. In the reflective state, one component of light is reflected by cholesteric liquid crystal material 24, in this example as yellow. Back opaque layer 14 will absorb all wavelengths of light except blue, which is also reflected back to observer 26. The reflected yellow and reflected blue wavelengths will be seen by observer 26 as the color white against the blue background of internal mask 12. When cholesteric liquid crystal 24 is in the transparent state, the blue color of back opaque layer 14 will be seen and will match the blue color of internal mask 12 such that a solid expanse of blue will be seen by observer 26 and no image will be observed.

In an alternate embodiment, internal mask 12 is pigmented white, cholesteric liquid crystal 24 has a pitch sufficient to reflect yellow light and back opaque layer 14 is pigmented blue. In the reflective state, one component of the light will reflect off cholesteric liquid crystal 24, in this example as yellow. Back opaque layer 14 will absorb all wavelengths of light except blue, which is reflected back to observer 26. The reflected yellow and reflected blue wavelengths will be seen by observer 26 as the color white, which will match white internal mask 12 to form a white, image-free display. In the transparent state, blue back opaque mask 14 will seen by observer 26, resulting in a blue image against the white background of internal mask 12. In further embodiments, internal mask 12, cholesteric liquid crystal 24 and back opaque layer 14 may contain differing pigments to provide other color combinations to be seen by observer 26.

During operation, referring by way of example to FIG. 2, to form a display, an electric field applied between front conductive film 18 and back conductive film 22 switches cholesteric liquid crystal 24 to its reflective state. Ambient light illuminating front surface 32 is mainly absorbed by internal mask 12. At opening 36, ambient light is reflected by cholesteric liquid crystal material 24, creating a bright appearance in contrast to surrounding internal mask 12. In the preferred embodiment, the color of internal mask 12 contrasts with the color of light reflected by cholesteric liquid crystal 24 while in the reflective state. As such, when device 10 is in the display mode, observer 26 will see display image 40 as defined by light reflecting back through opening 36 in internal mask 12. Any areas of cholesteric liquid crystal material 26 surrounding image 40 which have been activated by conductive film present in areas masked by internal mask 12 or which have become activated due to "bleeding" will be blocked by internal mask 12 and will not be visible. Similarly, any areas of the display which have become activated by temperature, flexion or other stresses will be masked by internal mask 12 and will not be visible to observer 26.

Figure 3:
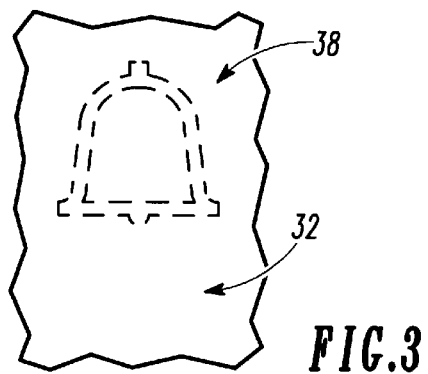
FIG. 3 is a plan view of the cholesteric liquid crystal display of FIG. 1, with the device in the transparent state.

In the preferred embodiment, to erase the display, referring to FIG. 3, an electric field applied between front conductive film 18 and back conductive film 22 switches cholesteric liquid crystal material 24 to its transparent state. As in the display mode, light which illuminates internal mask 12 is mainly absorbed except if desired for a reflected color. As light enters opening 36 through front plate 16, because cholesteric liquid crystal material 24 is transparent, light is transmitted through front film 18, cholesteric liquid crystal 24, back film 22 and back plate 20 and is mainly absorbed by opaque layer 14, except to the extent opaque layer 14 has been tinted to reflect a desired color. As such, observer 26 will see back opaque layer 14 through opening 36 in internal mask 12 which define display image 40. In the preferred embodiment, back opaque layer 14 is color-matched to internal mask 12. When observer 26 views device 10 in this mode, display image 40 will be seen as the same color as internal mask 12 and thus no image will be seen.

Thus, this invention provides a cholesteric liquid crystal device that forms a display with enhanced quality. The opaque layer and internal mask are easy to apply, add little to the thickness of the display panel and require minimal additional process steps and cost. In the transparent mode, the invention provides an image-free display of any desired color which is uniform in color and can be color coordinated to other parts of the display. In the reflective mode, the invention produces a very bright, high contrast image readily detectable to the human eye. The display area is clean and blemish-free, with an image easily confined to the desired region.

We claim:

1. A liquid crystal display device comprising:
   (a) a transparent front plate comprising an inner surface, an outer surface, and a front conductive film;
   (b) a back conductive film spaced apart from said front conductive film by a gap;
   (c) a cholesteric liquid crystal material within the gap that is responsive to an electric field applied across the front conductive film and said back conductive to switch between a transparent state and a reflective state;
   (d) an opaque mask overlying said front conductive film and defining an opening for transmitting light through the device; and
   (e) an opaque layer disposed to intercept light transmitted through the cholesteric layer in the transparent mode.

2. The device as described in claim 1, wherein said device further comprises a back plate having an inner surface and an outer surface, and said back conductive film uniformly coats the inner surface of the back plate and the front conductive film uniformly coats the inner surface of the transparent front plate.

3. The device as described in claim 1, wherein said opaque mask has a desired color and said opaque layer and said cholesteric liquid crystal material cooperate produce a substantially indistinguishable color.

4. The device as described in claim 1, wherein said opaque mask and said opaque layer are black.

5. The device as described in claim 1, wherein said opaque mask is a pigmented, polymeric coating.

6. The device as described in claim 5, wherein said opaque mask is composed of a positive photoresist layer which has been selectively cured such that the opening is free of photoresist material to expose the front conductive film.

7. The device as described in claim 1, wherein said opaque mask is formed of a uniform, transparent polymeric film that uniformly coats the front conductive film and contains pigmentation in areas about the opening and is substantially free of pigmentation at the opening.

8. The device as described in claim 1, wherein said opaque layer is a pigmented, polymeric coating.

9. The device as described in claim 8, wherein the device further comprises a back plate having an inner surface and an outer surface and the opaque layer is uniformly applied across the outer surface of said back plate.

10. A liquid crystal display device comprising:
    (a) a transparent front plate having a region for forming a display and comprising an inner surface, an outer surface and a front conductive film uniformly coating the inner surface at the region;

(b) a back plate space apart from the transparent front plate and comprising a back inner surface, back outer surface, back conductive film disposed on the back inner surface at the region;

(c) a cholesteric liquid crystal material within the gap that is responsive to an electric field applied across the front conductive film and said back conductive film to switch between a transparent state and a reflective state;

(d) an opaque mask material overlying the front conductive film at the region and formed of a pigmented, photoresist layer having a desired color, said mask defining an opening for admitting light to said cholesteric liquid crystal material;

(e) an opaque layer disposed on the back outer surface to intercept light transmitted through the cholesteric layer in the transparent mode and containing pigmentation that cooperates with the cholesteric liquid crystal material in one of said transparent state or said reflective state to provide a color substantially indistinguishable from the desired color.

11. The device as described in claim 10, wherein the opaque layer and the opaque mask are a substantially indistinguishable color.

12. The device as described in claim 10, wherein the opaque layer and the opaque mask are black.

13. The device as described in claim 10, wherein said device forms a display wherein the cholesteric liquid crystal material is in the reflective state and the opaque layer cooperates with the cholesteric liquid crystal material to produce the desired color.

14. The device as described in claim 10, wherein said device forms a display wherein the cholesteric liquid crystal material is in the transparent state and the opaque layer is pigmented to produce the desired color.

* * * * *